United States Patent
Perkins

(10) Patent No.: US 11,423,193 B1
(45) Date of Patent: Aug. 23, 2022

(54) PERSPECTIVE PIPING FOR A HUMAN MACHINE INTERFACE

(71) Applicant: Inductive Automation, LLC, Folsom, CA (US)

(72) Inventor: Michael Christopher Perkins, West Sacramento, CA (US)

(73) Assignee: INDUCTIVE AUTOMATION, LLC, Folsom, CA (US)

( * ) Notice: Subject to any disclaimer, the term of this patent is extended or adjusted under 35 U.S.C. 154(b) by 0 days.

(21) Appl. No.: 17/731,004

(22) Filed: Apr. 27, 2022

(51) Int. Cl.
    *G06F 30/17* (2020.01)
    *G06T 11/20* (2006.01)
    *G06F 30/12* (2020.01)
    *G06F 113/14* (2020.01)

(52) U.S. Cl.
    CPC .............. *G06F 30/17* (2020.01); *G06F 30/12* (2020.01); *G06T 11/203* (2013.01); *G06F 2113/14* (2020.01)

(58) Field of Classification Search
CPC ........ G06T 11/203; G06F 30/12; G06F 30/17; G06F 2113/14
See application file for complete search history.

(56) References Cited

U.S. PATENT DOCUMENTS

| | | | | |
|---|---|---|---|---|
| 2010/0318929 | A1* | 12/2010 | Hilton | G06T 11/60 715/848 |
| 2013/0132040 | A1* | 5/2013 | Shook | G06F 30/18 703/1 |
| 2020/0175372 | A1* | 6/2020 | Sharma | G06N 3/0418 |
| 2021/0096704 | A1* | 4/2021 | Ericsson | G06F 8/34 |
| 2021/0286349 | A1* | 9/2021 | Mabote | G05B 19/0423 |

OTHER PUBLICATIONS

Xu, Liutong, et al. "Pipe network 3D visualization service architecture." 2008 IEEE Congress on Services-Part I. IEEE, 2008. (Year: 2008).*
Mendez, Erick, et al. "Generating semantic 3D models of underground infrastructure." IEEE Computer Graphics and Applications 28.3 (2008): 48-57. (Year: 2008).*

* cited by examiner

*Primary Examiner* — Daniel F Hajnik
(74) *Attorney, Agent, or Firm* — Fenwick & West LLP

(57) ABSTRACT

An interface system generates interfaces for visualizing human-machine interactions including piping systems. The interface system receives, as input, parameters describing a first pipe data object and a second pipe data object. The pipe data objects can be diagrams representing physical piping in an industrial system. Using the parameters of the first and second pipe data objects, the system determines whether images of the pipes in the interface will overlap. When the system renders vector graphic images of the first pipe data object and the second pipe data object, the second pipe data object is rendered with markings that provide a visual indication that the two pipes overlap and are not connected. The interface system further enables a user to edit the piping diagram to combine the first and second pipe data objects into a single combined pipe data object and updates the rendered images for display.

20 Claims, 5 Drawing Sheets

PERSPECTIVE PIPING FOR A HUMAN MACHINE INTERFACE

TECHNICAL FIELD

The disclosure generally relates to human-machine interfaces, and in particular to generating piping components for rendering in human-machine interfaces.

BACKGROUND

Industrial systems can be complex and require diagramming for ease of understanding. As more systems are automated, it is increasingly important for users and managers to be able to accurately represent connections among different components of an industrial process flow. Users lack the ability to visualize these connective aspects of components, and especially the ability to customize diagrams such that many such connections can be rendered at once in a way that keeps the conduits and connections visually clear and separate.

SUMMARY

An interface system generates interfaces for visualizing human-machine interactions including piping systems. The interface system receives, as input, parameters describing a first pipe data object and a second pipe data object. The pipe data objects can be diagrams representing physical piping in an industrial system. Using the parameters of the first and second pipe data objects, the system determines whether images of the pipes in the interface will overlap. When the system renders vector graphic images of the first pipe data object and the second pipe data object, the second pipe data object is rendered with markings that provide a visual indication that the two pipes overlap and are not connected. The interface system further enables a user to edit the piping diagram to combine the first and second pipe data objects into a single combined pipe data object and updates the rendered images for display.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
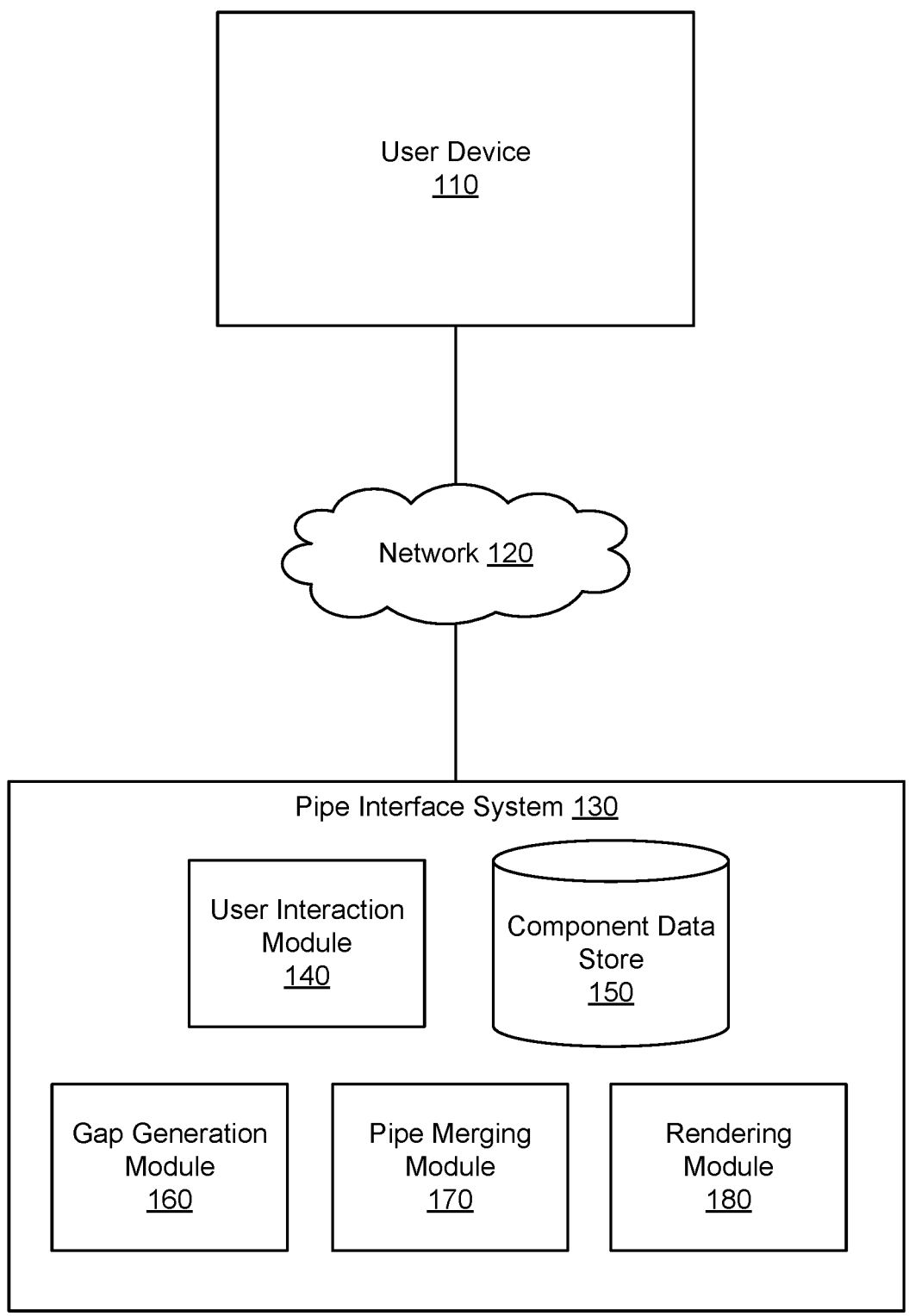
FIG. 1 is a high-level block diagram of a system architecture for a pipe interface system, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

A pipe interface system supports user interactions to instantiate, draw, edit, and view pipe components within a graphical display system. A user of the pipe interface system can add and move pipes within the interface and can also adjust properties of the pipe components individually to change the appearance or other aspects of a pipe. To generate a pipe component, the pipe interface system receives user input about the pipe properties from a user via a user device. The component properties of the pipe may include an origin point defined by x and y coordinates, connection points that define multiple segments of the pipe (e.g., if the pipe has a branch or a turn), and appearance properties such as color or shading. To store the information about the pipe component properties, the system generates a property tree representative of the pipe data object based on the received parameters. The system similarly stores property trees with pipe data object parameters when a user makes additional pipes via the interface. The system can determine when pipes overlap with each other and provides instructions for rendering gaps to indicate the overlap and separation of the multiple pipes accordingly. The system also updates pipe data when one pipe is combined with another pipe so that the child pipe will take on properties of the parent pipe.

The system environment described herein can be implemented as one aspect of a larger system, such as a design client, that coordinates the synchronization and display of data. In one embodiment, a display system has a backend and supports information displayed to users at client devices which represent a front end. The display system stores and provides information about user interfaces for applications such as web applications. The web applications may, for example, be web applications for monitoring and interacting with local or remote industrial systems and processes.

User interfaces for the applications may be generated by a designer or another user through a design client and may include views of components. User interfaces may include graphical user interfaces that use one or more graphical elements for interfacing with one or more users. In some embodiments, the components of a user interface correspond to physical components of an industrial or business system. For example, pipe data objects in the user interface may be representative of physical pipes in an industrial system. The display system stores information about such interfaces for display at client devices and manages and routes underlying data that may cause changes to the display of the interface at a client device. A component is a graphical element in a view that can be rendered for display at a client device. Information about a component is stored in the display system, for example, in the form of a component data model. Some examples of components include user interaction components (e.g., sliders, buttons, text fields, and drop down menus), and visual representations of machines or data related to industrial or business processes (e.g., visual representations of pipes, pumps, gauges, dials, levers, motors, conveyor belts, tanks, ovens, graphs, and so forth). The descriptions herein relate specifically to configuration and display of pipe components.

The display system stores information about components (i.e., "component properties," or "property values") that can be included in a GUI. In particular, the display system stores property trees that define the properties of the components and hosts the authoritative version of the various component property values and property tree configurations. A user device or other client device synchronizes its own data by updating its stored information to match the configuration and values provided by the display system.

A property tree is a data structure comprising a collection of nodes, wherein each node defines some property related to the component (and thus a "property" is a named variable associated with a component). The configuration of a node includes information about data bindings and script handlers that may be associated with the node. The value itself may be a number, a string, a null type, a Boolean, a dataset (i.e., a table-like structure of an ordered collection of rows and columns of information), an array forming an ordered sequence of other nodes in the property tree, or an unordered collection of other nodes. For example, a property tree may store properties defining a set of pipes.

By virtue of nodes whose values can be an array of other nodes or an unordered sequence of other nodes, a single node is able to encapsulate an arbitrarily structured, deeply nested collection of information, i.e., a tree data structure. These "property trees" are used to define the properties of the components in the GUI.

In one embodiment, a display system stores a component data model for each GUI component. A component data model comprises nodes that represent component properties structured into property trees, the structure of which trees is sometimes referred to as a "component hierarchy." Since component properties are represented by nodes in property trees, a component property may be associated with a data value or with a subtree of the component hierarchy comprising additional nodes. In one embodiment, each component property may additionally be assigned a name that identifies the component property.

Components are graphical elements that are placed and configured within a view of an application to be displayed in the GUI when the application is executed by a user device. As a graphical element, each component has a shape that is defined by one or more features presented in the GUI. The features of components are graphical aspects of the components and are defined by component properties and data values (i.e., component property values) associated with each component property. For example, one feature of a component may be a shape, e.g., sliders, buttons, text fields, and dropdown menus. Some components may provide visual representations of machines in industrial processes such as visual representations of pumps, gauges, dials, levers, motors, conveyor belts, tanks, ovens, etc. For example, a component may be a visual representation of a temperature scale. In another example, the component may present a slider that is oriented horizontally. For example, a component representing an oven might be a visual representation of an oven and may have component properties such as label, location within the view, color, size, oven temperature, oven humidity, and so forth. In some embodiments, some component properties may store information that does not necessarily influence display of the component in the GUI, but may store additional information about the component or about a data source that may be associated with the component. For example, a designer may choose not to display oven humidity, even though humidity is a component property stored as a data value associated with the oven component.

System Architecture

FIG. 1 is a high-level block diagram of a system architecture for a pipe interface system 130, in accordance with an example embodiment. The system environment of the pipe interface system 130 includes one or more user devices 110, a network 120, and the pipe interface system 130. In some embodiments, the system environment includes components other than those described herein. For example, as described previously, the pipe interface system 130 may be a submodule of a display system that facilitates user interface design and interaction by storing data about graphical element components. In alternate embodiments, the pipe interface system 130 may be associated with another interface display system or may stand alone. To avoid obscuring the information about the pipe interface system 130, a larger display system is not depicted in FIG. 1. For additional clarity, although one user device 110 is shown in FIG. 1, alternate embodiments of the system environment can have any number of user devices 110. For the purposes of concision, the web servers, data centers, and other components associated with an online system are not shown in FIG. 1.

Furthermore, in various embodiments, some or all of the modules of the pipe interface system 130 may be located on the user device 110. That is, although FIG. 1 illustrates an example system architecture in which the user interaction module 140, the component data store 150, the gap generation module 160, the pipe merging module 170, and the rendering module 180 are configured as parts of the pipe interface system 130, the user device 110 may be configured to have these functionalities in alternate embodiments. In one such example embodiment, the pipe interface system 130 manages backend information about pipe data objects (such as updates to their property values) and this information is sent to the user device 110 via the network where the vector graphic image of pipes may be generated according to the backed pipe data object information and displayed for the user.

A user device 110 allows a user to interact with the pipe interface system 130. The user device 110 is a computing device capable of transmitting and receiving data over the network 120. The user device 110 may be a conventional computer (e.g., a laptop or a desktop computer), a server, a cell phone, or a similar device. The user device 110 may also be configured to display an interface, including the layout of a set of pipes, and may include input systems such that a user of the user device 110 can input properties of pipe components.

The network 120 transmits data within the system environment. The network 120 may be a local area or wide area network using wireless or wired communication systems, such as the Internet. In some embodiments, the network 120 transmits data over a single connection (e.g., a data component of a cellular signal, or Wi-Fi, among others), or over multiple connections. The network 120 may include encryption capabilities to ensure the security of customer data. For example, encryption technologies may include secure sockets layers (SSL), transport layer security (TLS), virtual private networks (VPNs), and Internet Protocol security (IPsec), among others.

The pipe interface system 130 facilitates generation, updates, and display of pipe components in a display. As described previously, the pipe interface system 130 may be a subset of a larger interface display system that can provide instructions for rendering various components. The pipe interface system 130 includes various modules and data stores to manage storage and display of pipe components. The pipe interface system 130 includes a user interaction module 140, a component data store 150, a gap generation module 160, a pipe merging module 170, and a rendering module 180. Computer components such as web servers, network interfaces security functions, load balancers, failover servers, management and network operations consoles, and the like are not shown in FIG. 1 so as to not obscure the details of the system architecture. Moreover, the pipe interface system 130 may contain more, fewer, or different components than those shown in FIG. 1 and the functionality of the components as described herein may be distributed differently from the description herein.

The user interaction module 140 manages user interactions with data for generating and updating pipe component properties. When a user interacts with a pipe data object via a user interface at the user device 110, the data is received at the user interaction module 140. For example, a user may draw a new pipe, draw additional connections to an existing pipe, move a pipe (e.g., drag and drop), or update pipe properties (e.g., data bindings, appearance characteristics, etc.). The user interaction module 140 may allow a user to make changes to a pipe by dragging or drawing the pipe in a drawing window of an interface and/or by inputting data about the attributes of the pipe in a property tree view of the interface. In various embodiments, the user interaction module 140 supports receiving data about pipes from the interface when it is in a "draw mode" or when it is in a "move mode" in which the user can scale or drag the pipes to update the pipe attribute data. The user interaction module 140 may also receive data about pipe connections to other components of a display interface for storage in the pipe data object property tree. For example, other components that can be drawn by the user (e.g., sensors, motors, devices, gauges, etc.) can include connection points and a pipe may be snapped onto a connection point. This connection would be received by the user interaction module 140 to update the pipe data. Additionally, pipe component properties may have data bindings to other component properties of other components of the interface system such that when one of the values on a bound component is updated, it affects the value of the component property to which it is bound.

In one embodiment, the user interaction module 140 manages the creation of new pipes based on user inputs. Generating a new pipe may include instantiating a property tree data structure to store the data about the pipe. A pipe property tree may include information about a name of the pipe, an appearance type of the pipe (e.g., mimic, piping and instrumentation diagram (P&ID), wavy, etc.), a color, a pipe width, other pipe style attributes, an origin location for the pipe in x any coordinates, and an identification of pipe connections (e.g., coordinates of connections of pipe segments of the pipe), among other possible data. When a user initiates the creation of a new pipe, the user interaction module 140 receives the pipe instantiation data and stores it in the component data store 150 as a new pipe data object. The user interaction module 140 also receives updates from users at user devices 110. For example, if a user moves an existing pipe or updates the property values associated with a pipe, the user interaction module 140 receives these updates and updates the stored pipe data object data stored in the property tree. If two pipes are connected by a user, the user interaction module 140 also receives the update data for use by the pipe merging module 170.

The component data store 150 stores property trees that represent components of a display interface, including pipe components. When a user initiates the creation of a new pipe, the received data for the pipe data object is stored in the component data store 150. Similarly, when a user updates properties of a pipe data object, the changes are stored in the component data store 150. In one embodiment, the component data store 150 stores data about pipes in a property tree data structure. For example, a property tree for a certain interface may include a root node indicating a number of pipes in the interface, and child nodes each representing one of the pipes and themselves having child nodes representing pipe attributes and connection information.

The gap generation module 160 determines locations in the interface where indications that multiple pipes are overlapping will need to be rendered. These indications may be rendered in the form of gaps, shading, colors, lines or another visual indication that the pipes are crossing. The gap generation module 160 accesses the pipe data for all of the pipes in an interface. Using the pipe object data, the gap generation module 160 generates bounding boxes for the pipes. This may be for a subset of the pipes, or may be for all pipes in the interface. A bounding box is a rectangle (or other shape) that defines an area containing the pipe data object. This area includes any connections of the pipe, such as turns or corners in the pipe data object.

When the bounding boxes have been generated, the gap generation module 160 determines which bounding boxes from the set of bounding boxes have areas that overlap with other bounding boxes. If two bounding boxes do not have overlapping areas, then their corresponding pipe data objects will not overlap and no gap will need to be generated to visually indicate any pipe crosses. In one embodiment, the gap generation module 160 sets a flag or another indication for storage with the pipe data component in the component data store for each pipe data object that has a bounding box that overlaps with another bounding box. In another embodiment, the gap generation module 160 may run at the time an interface is requested for rendering and may send the bounding box results to the rendering module 180. The data is used by the rendering module 180 to determine which pipes to draw with gaps when the instructions for interface rendering are transmitted to a user device 110. In various embodiments, the gap generation module may recalculate bounding box data periodically, when a new pipe data object is added, when a pipe data object is updated, or when the pipes need to be rendered at a user interface.

The pipe merging module 170 manages updates to pipe data object property trees when two pipes are connected. For example, an interface may have a first pipe and a second pipe, and the user may drag a portion of the second pipe to a connection point of the first pipe. This may indicate to the user interaction module 140 that the pipes are to be combined. To combine the data for the two pipe data objects, the pipe merging module 170 updates the property trees for the pipes such that the property tree of the second pipe is a subtree of the property tree of the first pipe. This may include combining the property trees of the two pipes such that the property tree of the first pipe data object becomes the parent of the property tree of the second pipe data object. That is, the origin of the second pipe may become a connection point to the first pipe, and the pipe merging module 170 adjusts the property trees such that both the first pipe and the second pipe data objects have the origin point of the first pipe and the appearance characteristics of the first pipe. The second pipe will inherit any other characteristics of the first pipe as well. For example, if the first pipe is blue and the second pipe is green, the pipe merging module 170 updates the property tree such that the connected pipes are all rendered in blue. In one embodiment, the pipe merging module 170 may notify the gap generation module 160 that a change has been made to the pipe data objects and the gap generation module 160 may redetermine a bounding box for the newly combined pipe data object. It is noted that the merging step could occur at the user device 110, or at the pipe interface system 130 in various embodiments. However, if the merging step occurs at the user device 110, the pipe interface system 130 may also receive an update of the changes so that any other related backend changes related to the merging of the two property trees may be updated accordingly.

The rendering module 180 provides information to the user device 110 including instructions for rendering the pipes as described in the pipe data objects stored in the component data store 150. In one embodiment, the rendering module 180 may be a part of the user interaction module 140. In one embodiment, the rendering module 180 generates a scalable vector graphic (SVG) image of each pipe data object using the parameters and properties of the pipe data object as defined in the property tree. It is noted that although the vector graphics are referred to as SVG images herein, the systems and methods disclosed could be used with any kind of vector graphic, not only SVGs. In some embodiments, the SVG rendering steps may all occur at the user device 110 after receiving the property tree information from the pipe interface system 130. If there is an indication that there is an indication that the pipe being rendered has a bounding box that overlaps with that of another pipe, the rendering module 180 includes a visual masking on the edges of the pipe which indicates a separation between the pipe and any overlapping pipes. This indication may be rendered in the SVG as a gap. The rendering module 180 transmits the rendering instructions, such as the SVG for each of the pipes to the user device 110 for populating the user interface with the pipes.

Figure 2:
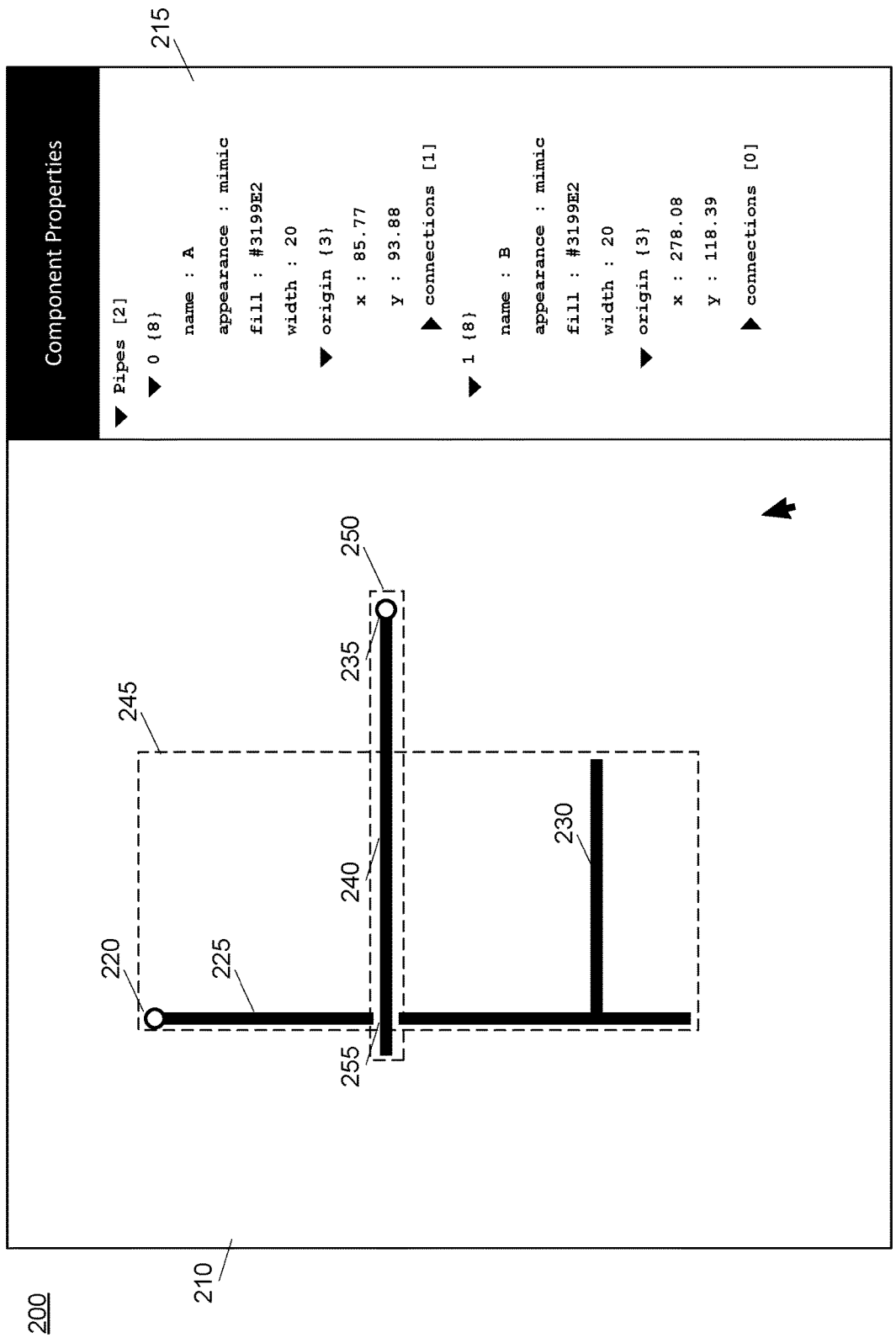
FIG. 2 is an example illustration of a component display interface with two pipe data objects, in accordance with one embodiment.

FIG. 2 is an example illustration of a component display interface with two pipe data objects, in accordance with one embodiment. A component display interface 200 may be an interface view that is accessed by a user of a user device 110 to generate or interact with human-machine interface diagrams or other system diagrams. The component display interface 200 includes a drawing pane 210 and a property tree pane 215. A user can use a cursor or another input device to draw, move, rotate, and scale the pipes in the drawing pane 210. The example component display interface 200 of FIG. 2 includes a first pipe and a second pipe. The first pipe has a first pipe origin point 220, a first pipe connection 225 (i.e., pipe segment), and a second pipe connection 230. The second pipe includes a second origin point 235 and comprises on pipe segment 240. FIG. 2 also shows a first bounding box 245 that defines the boundary of an area containing the first pipe and a second bounding box 250 that defines the boundary of an area containing the second pipe. The component display interface 200 typically would not render the bounding boxes 245 and 250, but they are included in FIG. 2 for illustrative purposes. Since the first bounding box 245 and the second bounding box 250 overlap, the pipes are rendered with a gap 255 that provides a visual indication that they are separate pipes that overlap in the diagram. In one embodiment, the order of the pipe data objects in an array of pipes (e.g., as shown in the property tree pane 215) defines which pipes will be rendered as being above other pipes in an SVG image. The property tree pane 215 includes a visualization of the component property values. For example, the property tree pane 215 of FIG. 2 includes data about the name, appearance type, fill color, width, origin coordinates, and connections for each of the pipes in the drawing pane 210. In one embodiment, user can edit values of the component properties for a pipe by editing the values in the property tree pane 215.

Figure 3:
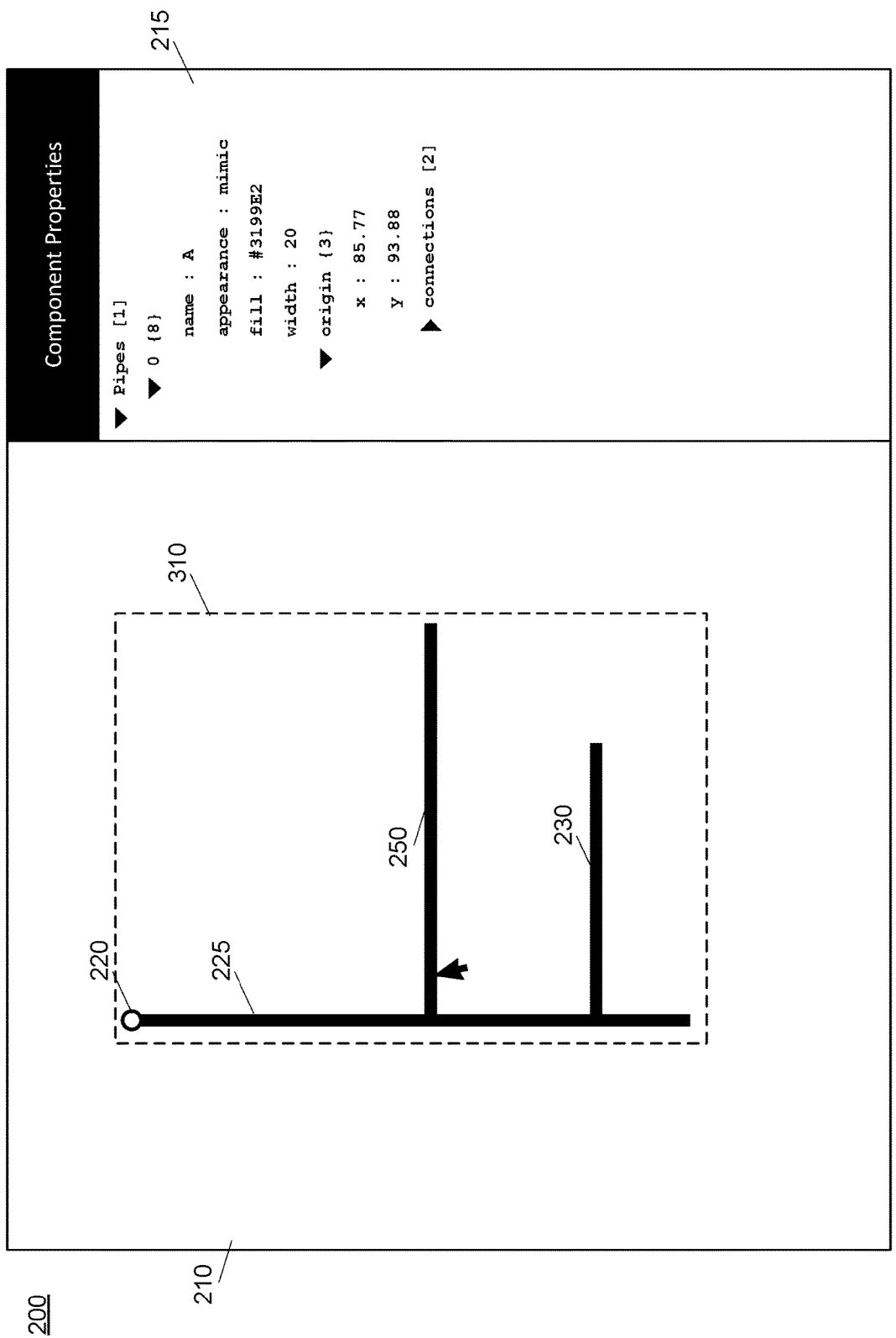
FIG. 3 is an example illustration of a component display interface in which two pipe data objects have been combined into a single pipe data object, in accordance with one embodiment.

FIG. 3 is an example illustration of a component display interface in which two pipe data objects have been combined into a single pipe data object, in accordance with one embodiment. In the example of FIG. 3, the user has indicated that the first pipe and the second pipe from FIG. 2 should be combined. In various embodiments, this indication may be made by dragging a pipe to a connection point on another pipe, selecting an option (e.g., in a right-click menu) to combine the pipes at overlapping points, or in another manner. As a result of the combination of the first pipe and the second pipe, the origin point 220 of the first pipe becomes the origin point for the combined pipe which is now made up of pipe connections 225, 230, and 250. Although the component display interface 200 may not display the bounding box, an updated bounding box 310 is generated for the new combined pipe. Additionally, the component property data is updated in the property tree pan 215, which now displays one pipe with two connections instead of the separate two pipes that were shown in FIG. 2.

Figure 4:
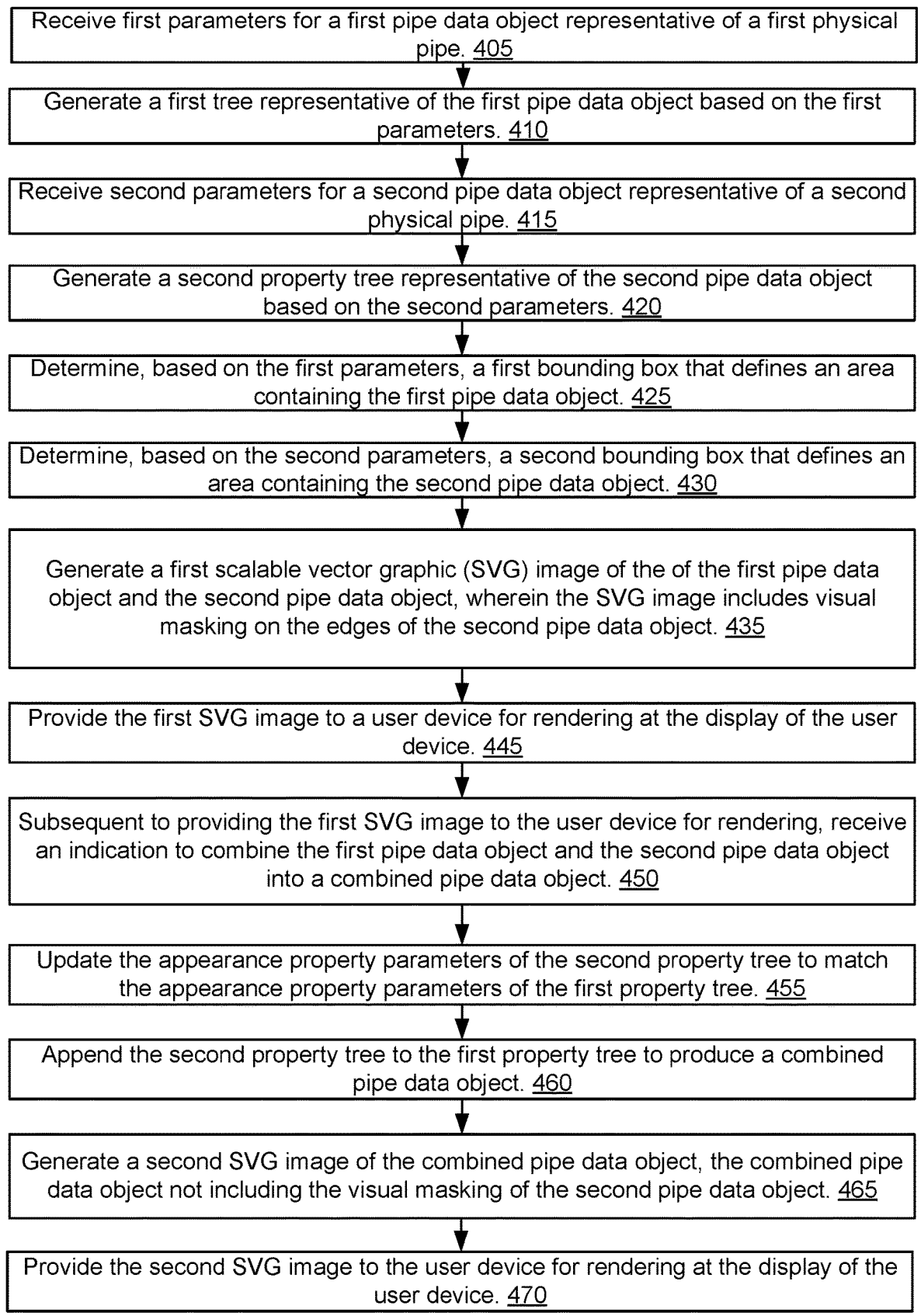
FIG. 4 is a flow diagram illustrating a process for generating interfaces for visualizing human-machine interactions, in accordance with an example embodiment.

FIG. 4 is a flow diagram illustrating a process for generating interfaces for visualizing human-machine interactions, in accordance with an example embodiment. The pipe interface system 130 receives 405 first parameters for a first pipe data object as user inputs from a user device. the first pipe data object may be representative of a first physical pipe. The first parameters may include: a first origin point defined by a first x coordinate and a first y coordinate, a first set of connection points defining one or more segments of the first pipe data object in relation to the first origin point, and a first set of appearance properties. Using the first parameters received from the user device, the pipe interface system 130 generates 410 a first tree (i.e., property tree data structure) representative of the first pipe data object. The pipe interface system 130 also receives 415, as user inputs from the user device, second parameters for a second pipe data object which may be representative of a second physical pipe. The parameters for the second data object include: a second origin point defined by a second x coordinate and a second y coordinate, a second set of connection points defining one or more segments of the second pipe data object in relation to the second origin point, and a second set of appearance properties. Using the second parameters, the pipe interface system 130 generates 420 a second property tree that is representative of the second pipe data object. The first pipe data object and the second pipe data object may represent connections between physical components of an industrial system.

The gap generation module 160 and the rendering module 180 use the data in the first property tree and the second property tree to generate scalable vector graphics (SVGs) for rendering at the user device. The gap generation module 160 determines 425, based on the first parameters, a first bounding box that defines an area containing the first pipe data object and also determines 430, based on the second parameters, a second bounding box that defines an area containing the second pipe data object. Responsive to the first bounding box intersecting with the second bounding box, the rendering module 180 generates 435 an SVG image of the first pipe data object and the second pipe data object. The SVG image is configured to render the first pipe data object according to the first parameters and to render the second pipe data object according to the second parameters. The SVG image is configured to include visual masking on the edges of the second pipe data object such that when the SVG image is rendered, the visual masking indicates a separation between the first pipe data object and the second pipe data object. The pipe interface system 130 provides 445 the SVG image to the user device for rendering at the display of the user device.

After transmitting the SVG image to the user device for rendering, the pipe interface system 130 receives 450 an indication to combine the first pipe data object and the second pipe data object into a combined pipe data object. The pipe interface system 130 updates 455 the appearance property parameters of the second property tree to match the appearance property parameters of the first property tree and appends 460 the second property tree to the first property tree to produce a combined pipe data object. The rendering module 180 generates 465 a second SVG image for rendering at the display of the user device. The second SVG image is an image of the combined pipe data object, where the combined pipe data object does not include the visual masking of the second pipe data object. The pipe interface system 130 provides 470 the second SVG image to the user device for rendering at the display of the user device. It is noted that these processes of rendering overlapping pipes and combining pipe data objects may be scaled to apply to more than two overlapping pipe data objects. In such embodiments, the pipe interface system 130 may iterate over the stored pipe data objects to determine which pipes will be rendered as overlapping other pipes (e.g., the later the pipe data object is in a stored array of pipe data objects the higher it is on the stack of overlapping pipes when rendered as an SVG image).

Additional Configuration Considerations

Figure 5:
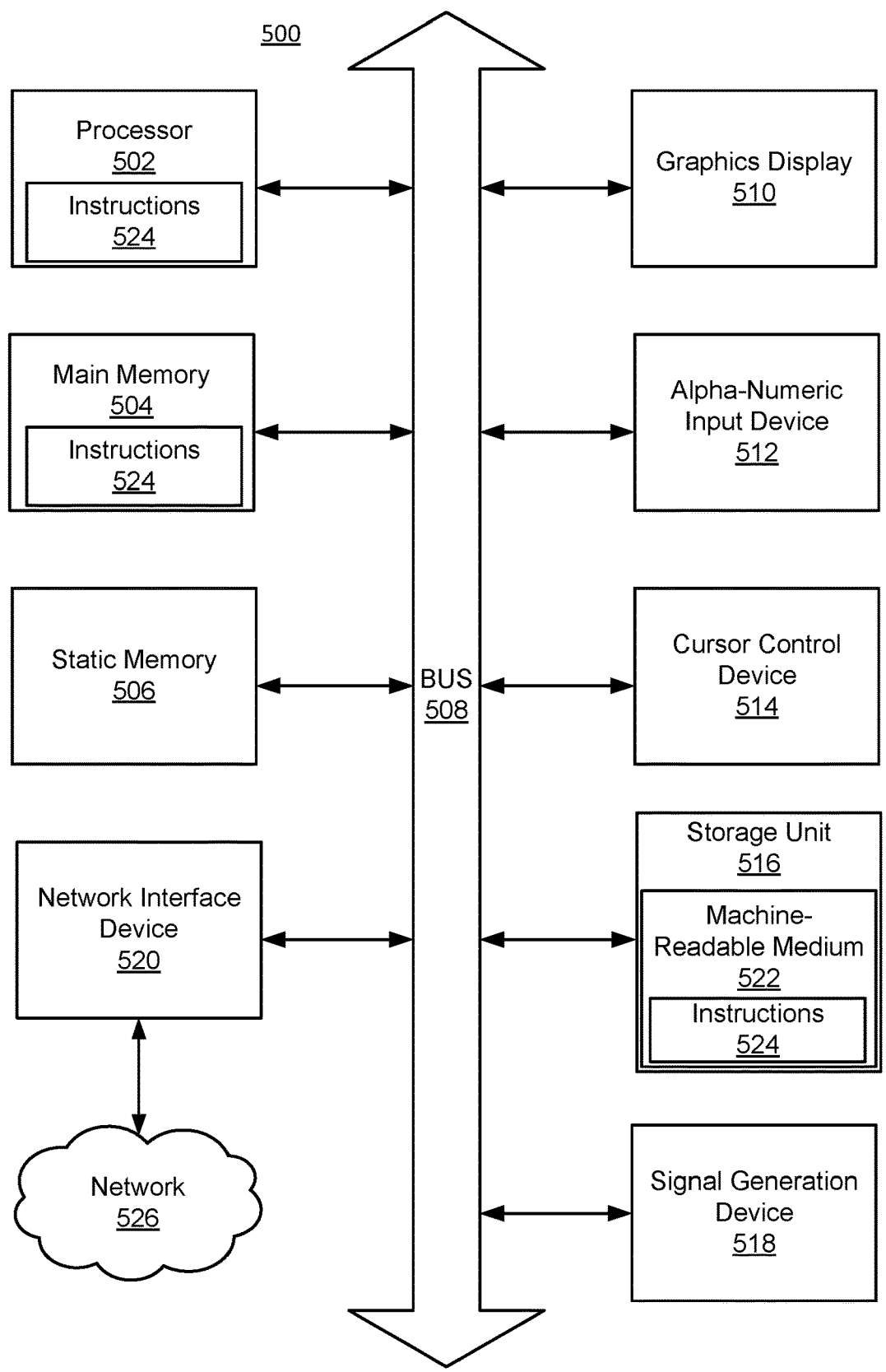
FIG. 5 is a block diagram illustrating components of an example machine able to read instructions from a machine-readable medium and execute them in one or more processors.

FIG. 5 is a block diagram illustrating components of an example machine able to read instructions from a machine-readable medium and execute them in one or more processors (or controllers). Specifically, FIG. 5 shows a diagrammatic representation of the pipe interface system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 506 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the user interaction module 140, the component data store 150, the gap generation module 160, the pipe merging module 170, and the rendering module 180. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of generating interfaces for visualizing human-machine interactions comprising:
    receiving, as user inputs from a user device, first parameters for a first pipe data object representative of a first physical pipe including:
        a first origin point defined by a first x coordinate and a first y coordinate;
        a first set of connection points defining one or more segments of the first pipe data object in relation to the first origin point; and
        a first set of appearance properties;
    generating a first tree representative of the first pipe data object based on the first parameters;
    receiving, as user inputs from the user device, second parameters for a second pipe data object representative of a second physical pipe including:
        a second origin point defined by a second x coordinate and a second y coordinate;
        a second set of connection points defining one or more segments of the second pipe data object in relation to the second origin point; and
        a second set of appearance properties;
    generating a second property tree representative of the second pipe data object based on the second parameters;
    determining, based on the first parameters, a first bounding box that defines an area containing the first pipe data object;
    determining, based on the second parameters, a second bounding box that defines an area containing the second pipe data object;
    responsive to the first bounding box intersecting with the second bounding box:
        generating, for rendering at the display of the user device, a first vector graphic image of the first pipe data object and the second pipe data object, wherein the display of the first pipe data object is defined by the first parameters and wherein the display of the second pipe data object is defined by the second parameters, wherein the first SVG image includes visual masking on the edges of the second pipe data object image such that when the first SVG image is rendered, the visual masking indicates a separation between the first pipe data object and the second pipe data object;
        providing the first vector graphic image for rendering at the display of the user device;
    subsequent to providing the first vector graphic image for rendering at the display of the user device, receiving, as an input from the user device, an indication to combine the first pipe data object and the second pipe data object into a combined pipe data object;
    updating the appearance property parameters of the second property tree to match the appearance property parameters of the first property tree;
    appending the second property tree to the first property tree to produce a combined pipe data object;
    generating, for rendering at the display of the user device, a second vector graphic image of the combined pipe data object, the combined pipe data object not including the visual masking of the second pipe data object; and
    providing the second vector graphic image for rendering at the display of the user device.

2. The method of claim 1, wherein the first pipe data object and the second pipe data object represent connections between components of an industrial system.

3. The method of claim 1, wherein the first set of appearance properties and the second set of appearance properties each include at least one of: color, style, width, line, or type.

4. The method of claim 1, wherein the indication to combine the first pipe data object and the second pipe data object into a combined pipe data object comprises the user dragging the second pipe in a rendered interface on a user device to connect with a connection point of the first pipe.

5. The method of claim 1, wherein a user can view, in a rendered interface on a user device, information about the first parameters of the first pipe data object and the second parameters of the second pipe data object.

6. The method of claim 1, wherein generating a second vector graphic image of the combined pipe data object further comprises determining a third bounding box that defines an area containing the combined pipe data object.

7. The method of claim 1, wherein appending the second property tree to the first property tree comprises adding the second property tree as a connection of the first property tree such that the origin of the first property tree becomes the origin of both the second property tree and the first property tree.

8. A computer system comprising:
  at least one processor for executing computer program instructions; and
  a non-transitory computer-readable storage medium comprising stored instructions executable by a processor that when executed cause the processor to:
    receive, as user inputs from a user device, first parameters for a first pipe data object representative of a first physical pipe including:
      a first origin point defined by a first x coordinate and a first y coordinate;
      a first set of connection points defining one or more segments of the first pipe data object in relation to the first origin point; and
      a first set of appearance properties;
    generate a first tree representative of the first pipe data object based on the first parameters;
    receive, as user inputs from the user device, second parameters for a second pipe data object representative of a second physical pipe including:
      a second origin point defined by a second x coordinate and a second y coordinate;
      a second set of connection points defining one or more segments of the second pipe data object in relation to the second origin point; and
      a second set of appearance properties;
    generate a second property tree representative of the second pipe data object based on the second parameters;
    determine, based on the first parameters, a first bounding box that defines an area containing the first pipe data object;
    determine, based on the second parameters, a second bounding box that defines an area containing the second pipe data object;
    responsive to the first bounding box intersecting with the second bounding box:
      generate, for rendering at the display of the user device, a first vector graphic image of the first pipe data object and the second pipe data object, wherein the display of the first pipe data object is defined by the first parameters and wherein the display of the second pipe data object is defined by the second parameters, wherein the first vector graphic image includes visual masking on the edges of the second pipe data object image such that when the first vector graphic image is rendered, the visual masking indicates a separation between the first pipe data object and the second pipe data object;
      provide the first vector graphic image for rendering at the display of the user device;
      subsequent to providing the first vector graphic image for rendering at the display of the user device, receive, as an input from the user device, an indication to combine the first pipe data object and the second pipe data object into a combined pipe data object;
      update the appearance property parameters of the second property tree to match the appearance property parameters of the first property tree;
      append the second property tree to the first property tree to produce a combined pipe data object;
      generate, for rendering at the display of the user device, a second vector graphic image of the combined pipe data object, the combined pipe data object not including the visual masking of the second pipe data object; and
      provide the second vector graphic image for rendering at the display of the user device.

9. The computer system of claim 8, wherein the first pipe data object and the second pipe data object represent connections between components of an industrial system.

10. The computer system of claim 8, wherein the first set of appearance properties and the second set of appearance properties each include at least one of: color, style, width, line, or type.

11. The computer system of claim 8, wherein the indication to combine the first pipe data object and the second pipe data object into a combined pipe data object comprises the user dragging the second pipe in a rendered interface on a user device to connect with a connection point of the first pipe.

12. The computer system of claim 8, wherein a user can view, in a rendered interface on a user device, information about the first parameters of the first pipe data object and the second parameters of the second pipe data object.

13. The computer system of claim 8, wherein generating a second vector graphic image of the combined pipe data object further comprises determining a third bounding box that defines an area containing the combined pipe data object.

14. The computer system of claim 8, wherein appending the second property tree to the first property tree comprises adding the second property tree as a connection of the first property tree such that the origin of the first property tree becomes the origin of both the second property tree and the first property tree.

15. A non-transitory computer-readable storage medium comprising stored computer program instructions executable by at least one processor of a system, the instructions when executed causing the processor to:
  receive, as user inputs from a user device, first parameters for a first pipe data object representative of a first physical pipe including:
    a first origin point defined by a first x coordinate and a first y coordinate;
    a first set of connection points defining one or more segments of the first pipe data object in relation to the first origin point; and
    a first set of appearance properties;
  generate a first tree representative of the first pipe data object based on the first parameters;
  receive, as user inputs from the user device, second parameters for a second pipe data object representative of a second physical pipe including:

a second origin point defined by a second x coordinate and a second y coordinate;

a second set of connection points defining one or more segments of the second pipe data object in relation to the second origin point; and a second set of appearance properties;

generate a second property tree representative of the second pipe data object based on the second parameters;

determine, based on the first parameters, a first bounding box that defines an area containing the first pipe data object;

determine, based on the second parameters, a second bounding box that defines an area containing the second pipe data object;

responsive to the first bounding box intersecting with the second bounding box:

generate, for rendering at the display of the user device, a first vector graphic image of the first pipe data object and the second pipe data object, wherein the display of the first pipe data object is defined by the first parameters and wherein the display of the second pipe data object is defined by the second parameters, wherein the first vector graphic image includes visual masking on the edges of the second pipe data object image such that when the first vector graphic image is rendered, the visual masking indicates a separation between the first pipe data object and the second pipe data object;

provide the first vector graphic image for rendering at the display of the user device;

subsequent to transmitting the first vector graphic image and the second vector graphic image to the user device for rendering at the display of the user device, receive, as an input from the user device, an indication to combine the first pipe data object and the second pipe data object into a combined pipe data object;

update the appearance property parameters of the second property tree to match the appearance property parameters of the first property tree;

append the second property tree to the first property tree to produce a combined pipe data object;

generate, for rendering at the display of the user device, a second vector graphic image of the combined pipe data object, the combined pipe data object not including the visual masking of the second pipe data object; and provide the second vector graphic image for rendering at the display of the user device.

16. The non-transitory computer-readable storage medium of claim 15, wherein the first pipe data object and the second pipe data object represent connections between components of an industrial system.

17. The non-transitory computer-readable storage medium of claim 15, wherein the first set of appearance properties and the second set of appearance properties each include at least one of: color, style, width, line, or type.

18. The non-transitory computer-readable storage medium of claim 15, wherein the indication to combine the first pipe data object and the second pipe data object into a combined pipe data object comprises the user dragging the second pipe in a rendered interface on a user device to connect with a connection point of the first pipe.

19. The non-transitory computer-readable storage medium of claim 15, wherein a user can view, in a rendered interface on a user device, information about the first parameters of the first pipe data object and the second parameters of the second pipe data object.

20. The non-transitory computer-readable storage medium of claim 15, wherein generating a second vector graphic image of the combined pipe data object further comprises determining a third bounding box that defines an area containing the combined pipe data object.

* * * * *